United States Patent [19]

Damsohn et al.

[11] Patent Number: 5,718,286

[45] Date of Patent: Feb. 17, 1998

[54] HEAT TRANSFER DEVICE

[75] Inventors: Herbert Damsohn, Aichwald; Conrad Pfender, Besigheim, both of Germany

[73] Assignee: Behr GmbH & Co., Stuttgart, Germany

[21] Appl. No.: 691,897

[22] Filed: Aug. 1, 1996

[30] Foreign Application Priority Data

Aug. 1, 1995 [DE] Germany .................. 195 28 117.9

[51] Int. Cl.$^6$ ............................................... F28F 3/08
[52] U.S. Cl. ................................. 165/167; 165/DIG. 363
[58] Field of Search ............................... 165/166, 167

[56] References Cited

U.S. PATENT DOCUMENTS

| | | |
|---|---|---|
| 3,017,161 | 1/1962 | Slaasted . |
| 4,516,632 | 5/1985 | Swift et al. ............... 165/167 |
| 4,744,414 | 5/1988 | Schon . |
| 4,815,534 | 3/1989 | Fuerschbach . |
| 5,429,183 | 7/1995 | Hisamori et al. . |

FOREIGN PATENT DOCUMENTS

| | | |
|---|---|---|
| 0 503 080 | 9/1992 | European Pat. Off. . |
| 929698 | 1/1948 | France . |
| 2412805 | 7/1979 | France . |
| 2 583 864 | 12/1986 | France . |
| 540 918 | 12/1931 | Germany . |
| 37 09 278 | 3/1989 | Germany . |
| 32 06 397 | 10/1994 | Germany . |
| 62-213688 | 9/1987 | Japan .................. 165/167 |
| 3-7885 | 1/1991 | Japan .................. 165/167 |
| 629385 | 9/1949 | United Kingdom . |
| 732637 | 6/1955 | United Kingdom .......... 165/167 |
| 2 019 550 | 10/1979 | United Kingdom . |

*Primary Examiner*—Allen J. Flanigan
*Attorney, Agent, or Firm*—Evenson, McKeown, Edwards & Lenahan, P.L.L.C.

[57] ABSTRACT

A plate sandwich structure for a heat transfer device provides flow duct plate units alternately stacked upon one another having flow duct breakthroughs which extend between two lateral plate areas as well as with connection duct breakthroughs, which are arranged separately from the flow duct breakthroughs, and connection cover plate units having connection duct breakthroughs arranged at least in two lateral plate areas. The last named breakthroughs suitably overlap with equal-sided ends in a flow duct breakthrough of one adjoining lateral plate area as well as a connection duct breakthrough of a flow duct plate unit adjoining the other lateral plate area. This results in two separate flow duct systems which are capable of passing two fluids in a cross current, reverse current or direct current. The structure can be used, for example, as a high temperature battery cooling element.

3 Claims, 3 Drawing Sheets

HEAT TRANSFER DEVICE

BACKGROUND AND SUMMARY OF THE INVENTION

This invention relates to a heat transfer device constructed of several plates which are stacked upon one another and have breakthroughs.

Heat transfer devices of this type are described, for example, in German Patent document DE 32 06 397 C2. There, plates of the same type which are each provided with parallel rows of oblong breakthroughs are stacked upon one another in such a manner that the breakthroughs of one plate are in a fluidal connection with adjacent breakthroughs of the same row of an adjoining plate. In this manner, each group of superimposed rows of breakthroughs forms a two-dimensional flow duct network, the planes of the network being situated in parallel to the stacking direction. The individual networks within the stack have no fluidal connection with respect to one another. By means of suitable inflow and outflow devices on the sides of the stack, in the direction of which the networks are open, the individual networks may be divided into several groups, a specific fluid flowing through each of the groups.

From German Patent document DE 37 09 278 C2, a heat transfer device constructed of a plate stack is known, in which the mutually stacked plates are provided on one of the two flat sides with longitudinal grooves situated side-by-side which are used as flow ducts. During the stacking, as required, adjacent plates with the same orientation are then arranged so that they are tilted with respect to one another by 180° or rotated with respect to one another by 90°, whereby co-current or countercurrent arrangements with a larger or smaller duct cross-section, or cross-current arrangements, are formed.

This invention is based on the technical problem of providing a heat transfer device of the above-mentioned type which can be produced with relatively low expenditures, is suitable for the separate flow-through of at least two heat transfer fluids and ensures sufficiently low pressure losses, laminar flow conditions, as well as a satisfactory heat transfer capacity.

This problem is solved according to the present invention by a heat transfer device constructed of several plates which are stacked upon one another and have breakthroughs. Flow duct plate units are provided with one or more flow duct breakthroughs, which are situated side-by-side and extend between two lateral plate areas, as well as with connection duct breakthroughs, which are arranged separately from the flow duct breakthroughs. Connection cover plate units are provided which have connection duct breakthroughs arranged at least in two lateral plate areas. The flow duct plate units and the connection cover plate units are alternately stacked above one another in such a manner that (1) no fluidal connection exists between the flow duct breakthroughs of adjacent flow duct plate units, and (2) the equal-sided ends of the flow duct breakthroughs of one flow duct plate unit respectively, by way of an overlapping connection duct breakthrough of an adjoining connection cover plate unit, are in a fluidal connection with one another, as well as by way of overlapping connection duct breakthroughs of adjoining plate units are in a fluidal connection with the equal-sided ends of the flow duct breakthroughs of a respective every other flow duct plate unit.

For implementing the plate stack construction of this heat transfer device, only plate units are required which are provided with suitable breakthroughs which can be formed with low expenditures, for example, by means of stamping. In this case, the flow duct breakthroughs of the flow duct plate units form the heat-exchange-active flow ducts which therefore extend perpendicularly to the stacking direction and are bounded in each case by adjacent connection cover plate units. In addition to this flow duct cover function, the connection cover plate units simultaneously carry out a connection function which consists of providing, by means of corresponding connection duct breakthroughs, a fluidal connection for the equal-sided ends of the flow duct breakthroughs of a respective flow duct plate unit with respect to one another. By means of other, appropriately mutually overlapping connection duct breakthroughs of adjoining plate units, specifically of connection cover plate units as well as of flow duct plate units, in addition, the equal-sided ends of the flow duct breakthroughs of every other flow duct plate unit are in a fluidal connection with one another, while no fluidal connection exists between the flow duct breakthroughs of adjacent flow duct plate units.

In this manner, by way of the first group of the every other flow duct plate units, a first fluid and, by way of the second group of interposed, every other flow duct plate units, a second fluid can be guided through the plate construction transversely to the stacking direction. This is done so that, in each case, heat from one fluid is transferred to the other fluid in parallel to the stacking direction. The selected plate stack construction causes a laminar fluid flow action and permits the implementation of the heat transfer device with a small duct width in the heat transfer direction of, for example, less than 300 µm for low-viscous fluids. In this case, for fluids having a high viscosity, duct widths on the order of up to approximately 1 mm are preferably selected. By means of the length of the plate units in the longitudinal direction of the flow duct breakthroughs, the effective heat exchange length can be adjusted, and by way of the number of plate units stacked above one another, the effective flow cross-section for the two fluids can be adjusted. An appropriate structure and stacking of the flow duct plate units and of the connection cover plate units permits an implementation of cross-flow as well as counterflow heat transfer devices.

As a result of a further embodiment of the invention, a cross-flow heat transfer device is advantageously implemented for whose plate stack construction, with the exception of the end plates, only two different individual plate structures are required. Another preferred embodiment according to the invention provides in a simple manner an advantageous connection possibility of the inflow and outflow of the fluids through the use of a suitable connection plate unit.

A further embodiment of the invention implements a co-current or a countercurrent heat transfer device for whose plate stack construction three types of individual plates are used which are provided with breakthroughs differently in a suitable manner.

Another advantageous implementation of a co-current or countercurrent heat transfer device is obtained by a further embodiment of the invention. Apart from the respective end plates and a possible connection plate, two types of individual plates, provided with different breakthroughs, are sufficient for the plate construction of this heat transfer device.

Other objects, advantages and novel features of the present invention will become apparent from the following detailed description of the invention when considered in conjunction with the accompanying drawings.

DETAILED DESCRIPTION OF THE DRAWINGS

Figure 1:
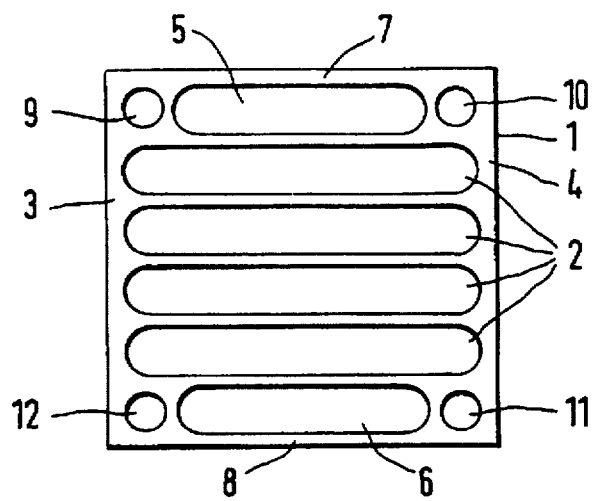
FIG. 1 is a top view of a flow duct plate and a connection cover plate of which, for implementing a plate stack construction for a cross-current heat transfer device, several are in each case alternately stacked above one another in a suitable manner.
Figure 2:
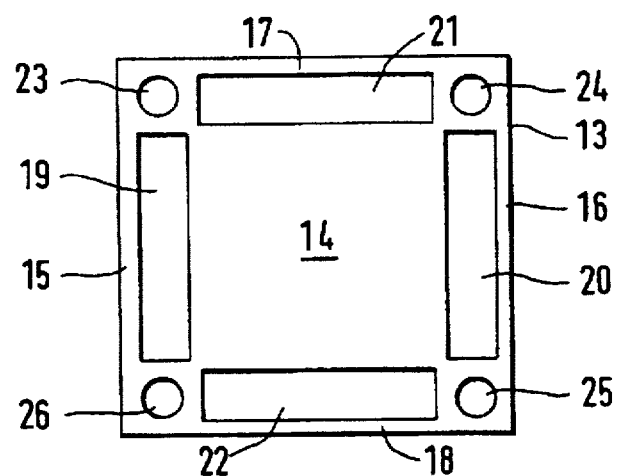
FIG. 2 is a top view of a flow duct plate and a connection cover plate of which, for implementing a plate stack construction for a cross-current heat transfer device, several are in each case alternately stacked above one another in a suitable manner.
Figure 3:
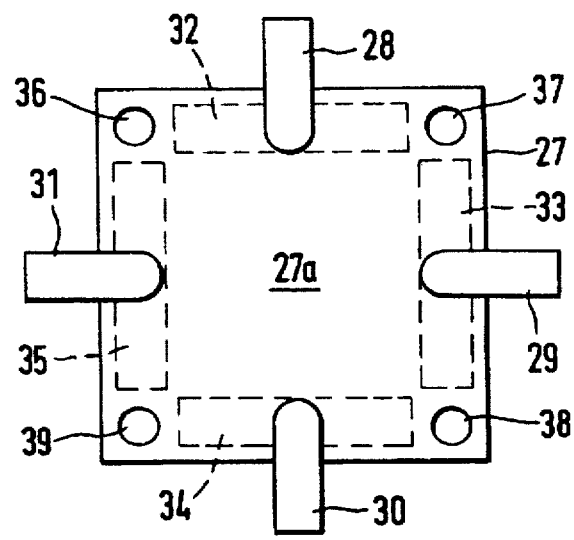
FIG. 3 is a top view of a connection plate which can be used for the heat transfer device plate stack construction which can be implemented using the plates according to FIGS. 1 and 2.

FIGS. 1 to 3 illustrate the plate elements used for a cross-current heat transfer device of a plate stack construction. Specifically, in respective top views, FIG. 1 shows a flow duct plate 1, FIG. 2 shows a connection cover plate 13, and FIG. 3 shows a connection plate 27. All of the plates 1, 13, 27 can be produced with low technical expenditures as individual sheet metal plates in a low-cost manner, for example, by stamping, laser beam cutting, water torch cutting or eroding. The plates all have a conformal square overall dimension. The individual plates preferably have a thickness of approximately 300 μm or less.

According to FIG. 1, the flow duct plate 1 contains four side-by-side, parallel extending flow duct breakthroughs 2 in the form of linear, elongated openings which extend between two opposite lateral areas 3, 4 of the flow duct plate 1. This row of flow duct breakthroughs 2 is adjoined on both sides by one elongated connection duct breakthrough 5, 6 respectively. The two connection duct breakthroughs 5, 6 extend along the two other lateral plate areas 7, 8 and, in each case, end in front of the plate corner areas in which one bore 9 to 12 respectively is placed. One turnbuckle is respectively guided through each bore 9 to 12 for producing the plate stack.

The connection cover plate 13 has an unperforated, central cover area 14 as well as elongated connection duct breakthroughs 19 to 22 along each of its four lateral areas 15 to 18 which end in front of the plate corner areas. Four turnbuckle bores 23 to 26 are situated in the corner areas.

For the construction of the heat transfer device plate stack, one flow duct plate 1 and one connection cover plate 13 respectively are now alternately placed upon one another, in which case the respective nearest flow duct plate 1 is arranged rotated by 90° with respect to the respective preceding flow duct plate 1. In this manner, two of the connection duct breakthroughs 19 to 22 respectively of a connection cover plate 13 overlap with the two connection duct breakthroughs 5, 6, of an adjoining flow duct plate 1, while the two other connection duct breakthroughs overlap with the ends of the flow duct breakthroughs 2 of this flow duct plate 1 situated in the corresponding lateral area so that these ends are in a fluidal connection with one another for the purpose of a parallel feeding and removal of a heat transfer fluid. When, for example, the connection cover plate 13 of FIG. 2, in the shown position, is placed on the flow duct plate 1 of FIG. 1 in the position illustrated there, the connection duct breakthroughs which are on top 5, 21 and on the bottom 6, 22 in FIGS. 1 and 2, overlap. This creates two opposite lateral connection ducts, that is, a distributor duct and a collecting duct which are separated by the flow duct breakthroughs 2 of this flow duct plate 1. The left 19 and the right connection duct breakthrough 20 of the connection cover plate 13 overlap with the left and right ends of the flow duct breakthroughs 2. In the case of a flow duct plate 1 placed next on the connection cover plate 13 in a position rotated by 90° with respect to FIG. 1, the left and the right connection duct breakthrough of this flow duct plate 1 will then overlap with the two corresponding connection duct breakthroughs 19, 20 of the connection cover plate 13. The two other connection duct breakthroughs 21, 22 of the latter place the respective equal-sided ends of the flow duct breakthroughs 2 of this next flow duct plate 1 in a fluidal connection with one another.

In this manner, four lateral connection ducts are created which extend in the stacking direction and of which one respectively is used as a distributor duct and an opposite duct is used as a collecting duct. The flow duct plates 1 in the stack form two groups of plates which are oriented in the same manner with respect to one another and are arranged to be rotated by 90° with respect to those of the other group, in which case the flow duct plates of one group are arranged alternately to those of the other group in the stack. In this manner, the flow duct breakthroughs 2 of every other flow duct plate connect a pertaining distributor duct with the opposite collecting duct, while the flow duct breakthroughs 2 of the interposed flow duct plates in a respective crossed manner connect the other distributor duct with its opposite collecting duct.

In order to provide respective connections from and to the outside for the distributor ducts and the collecting ducts, the end plate 27 according to FIG. 3 is arranged on one end of the stack adjoining the last connection cover plate. The end plate 27 is provided in the center of each lateral area with a recess into which a pertaining connection 28 to 31 is entered, by which one fluidal connection respectively is created from the connection duct breakthroughs 32 to 35 of the adjoining connection cover plate indicated by an interrupted line in FIG. 3 to the outside. The cover plate 27 is also provided with four turnbuckle bores 36 to 39 in its four corner areas. The central area 27a of the cover plate 27, like that 14 of the connection cover plates 13, has no breakthroughs.

As an alternative to the arrangement of the connection plate 27, the lateral connections may also be provided by the spot-drilling of the lateral walls of the plate stack. The construction of the plate stack will then be completed by placing two conformal base plates, which are not shown and which also have only four turnbuckle bores in four corner areas, on both sides of the plate stack. In the four corner areas, the turnbuckles can then be guided through the aligned bores 9 to 12, 23 to 26, 36 to 39 and the individual plates can then be fixedly connected with one another. Depending on the tightness requirements, resistance to temperature, resistance to corrosion and compression resistance, all conventional, appropriate connection processes, such as gluing, soldering, welding, particularly diffusion welding, or a mechanically bracing technique may be used for establishing a tight and fixed connection of the individual plates for forming the cross-current plate stack.

The heat transfer device plate stack formed in this manner permits the guiding-through of two fluids, between which heat is to be transferred, in the cross-current process. One fluid is supplied on one side of the plate stack and, from the distributor duct arranged there, arrives in the flow duct breakthroughs 2 of the one group of every other flow duct plate. The fluid from the flow duct breakthroughs 2 collects on the opposite collecting duct and is discharged to the outside. In the same manner, the other fluid is supplied to the other distributor duct, flows from there through the flow duct breakthroughs 2 of the other group of flow duct plates and is withdrawn again by way of the opposite collecting duct. The heat exchange therefore takes place in parallel to the stacking direction in the cross-over area of the flow duct breakthroughs 2 of respective adjacent flow duct plates, in which case the two fluids flow along this effective heat transfer path with a slight pressure loss in a laminar manner, on the one hand, perpendicularly to the stacking direction and, on the other hand, perpendicularly to one another. The cross-current heat transfer device, which can be produced in this manner with relatively low expenditures, has a desired small duct width of 300 μm or less in the heat transfer direction. The other heat transfer characteristics may also be adjusted in the respective required manner by the approximate design of the individual plates. Specifically, on the one hand the length of the effective heat exchange path, as a result of the corresponding selection of the plate dimensions and thus of the length of the flow duct breakthroughs 2 and, on the other hand, the whole flow cross-section, as a result of the cross-wise stacking of a corresponding number of flow duct plates 1 above one another with the insertion of the respective connection cover plates 13, can be adjusted to a respective desired value. It is demonstrated that a minimal plate construction, in addition to the two end-side base plates and possibly the connection plate 27, contains two flow duct plates 1 with crosswise extending flow duct breakthroughs 2 as well as two connection cover plates 13 situated in-between.

Figure 4:
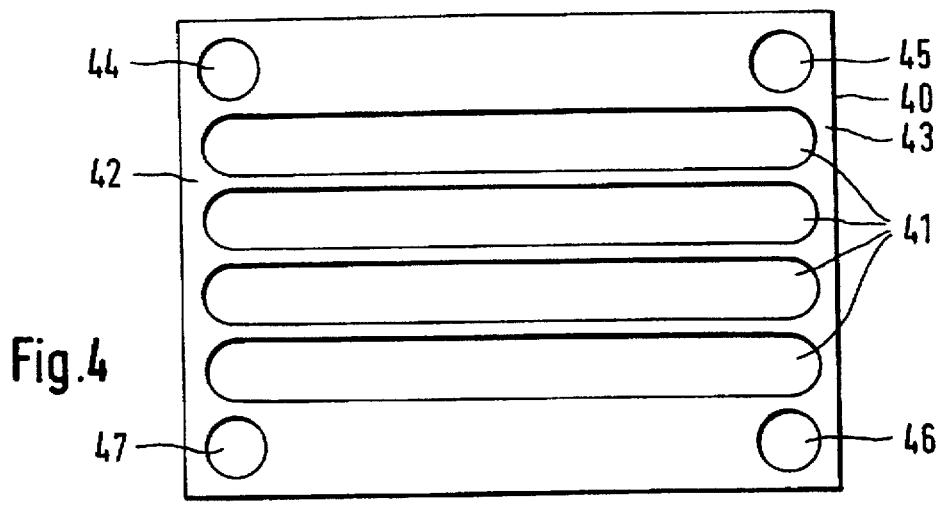
FIGS. 4 to 6 are top views of a flow duct plate, a distributor plate, and an intermediate plate of which, for implementing a plate stack construction for a co-current or countercurrent heat transfer device, several are in each case in a cyclical sequence appropriately stacked above one another.
Figure 5:
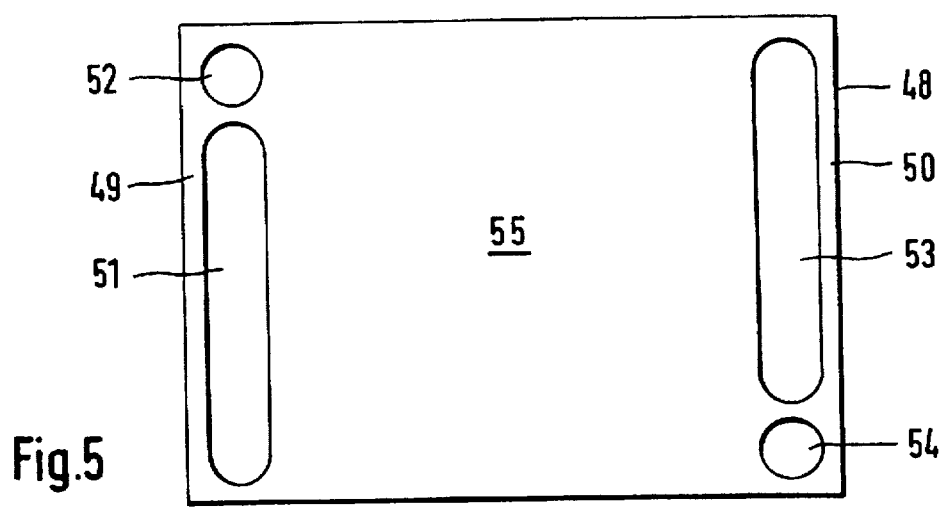
Figure 6:
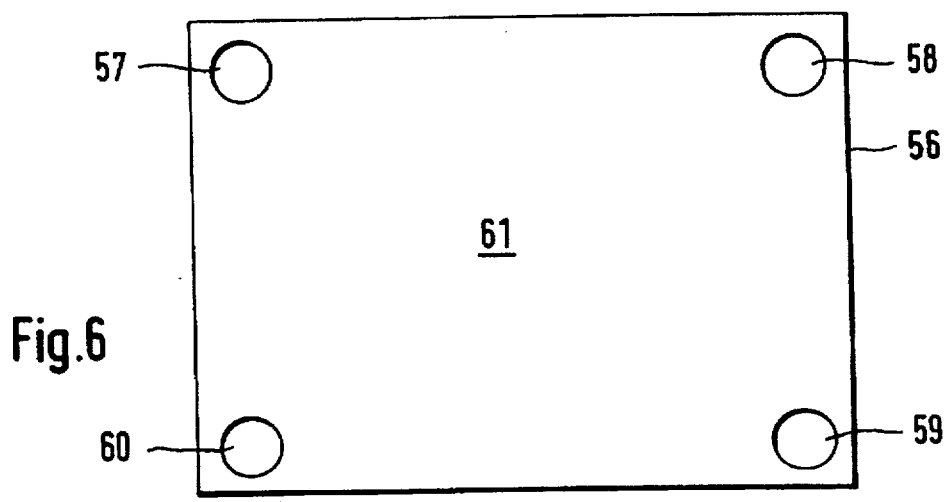

FIGS. 4 to 6 are respective top views of a flow duct plate 40, a distributor plate 48 and an intermediate plate 56 by which a plate stack can be built up for a co-current or countercurrent heat transfer device and which, in turn, in a simple manner, can be produced as stamped sheet metal plates provided with suitable breakthroughs, all three types of plates 40, 48, 56 having the same rectangular overall dimension. In the case of this plate construction of the heat transfer device, the connection cover plate units alternating in the stacking direction with the flow duct plates 40 consist of a distributor plate 48 illustrated in FIG. 5 and of an adjoining intermediate plate 56 illustrated in FIG. 6. Analogously to those of the previously example, the flow duct plates 40 have four linear flow duct breakthroughs which are each situated in parallel, side-by-side, and which extend between two opposite lateral areas 42, 43 of the plate In the four corner areas of the plate 70, four bores 44 to 47 are entered which in this example carry out a fluidal function.

In two opposite lateral areas 49, 50, the distributor plates 48 are provided in a mirror-symmetrical manner with respect to the plate center point in each case with a connection duct breakthrough 51 to 54 of which one 51, 53 extends as an elongated slot opening along the lateral area 49, 50 with the inclusion of a corner area, while the other connection duct breakthrough is designed as a circular opening 52, 54 situated in the other corner area. The remaining central distributor plate area 55 is used for covering the flow duct breakthroughs 41 of an, in each case, adjoining flow duct plate 40 with the exception of their ends which overlap with the elongated connection duct breakthroughs 51 to 54 of the distributor plate for creating suitable fluidal connections.

As illustrated in FIG. 6, the intermediate plates 56 used as the third plate stack component contain four circular connection duct breakthroughs 57 to 60 in the four corner areas, while in the remaining covering area 61, they have no other breakthroughs. During the construction of the heat transfer device plate stack, the three different plates according to FIGS. 4 to 6 are in each case repeatedly placed above one another in an alternating manner, in which case all flow duct plates 40 are arranged with the same orientation, whereas successive distributor plates 48 are each tilted or flipped by 180°; that is, they are arranged in a reversed manner. As a result, a co-current or countercurrent arrangement is implemented for two heat transfer fluids.

The reason is that, when the three different plates 40, 48, 56 are placed upon one another in their orientation illustrated in FIGS. 4 to 6, on the one hand, two continuous, circular connection ducts are created in the corner area which is on the top left or on the bottom right in FIGS. 4 to 6 by means of the aligned overlapping of the circular connection duct breakthroughs 44, 52, 57 and 46, 54, 59 shown there. These two flow ducts lead in the stacking direction past the flow duct breakthroughs 41 of the corresponding flow duct plate 40 without any fluidal connection thereto. In contrast, the two elongated connection duct breakthroughs 51, 53 of the distributor plate 48 overlap with the ends of the adjoining flow duct breakthroughs 41 situated in the corresponding lateral area, whereby they are in a fluidal connection with one another. Furthermore, they overlap because of the fact that they each extend into a corner area, with the circular connection duct breakthroughs of the two adjoining plates 40, 56 situated there; that is, with the connection duct breakthroughs 45, 58 of the flow duct plate and intermediate plate 40, 56 which are on the left bottom 47, 60 and on the right top 45, 48 in FIGS. 4 and 6.

By means of the flipped arranging of the distributor plate 48 in the successive group of three plates, i.e., of the flow duct plate, the distributor plate and the intermediate plate 40, 48, 56, a fluidal connection is established between the ends of the flow duct breakthroughs 41 of this next flow duct plate 40 and the two connection ducts which are situated diagonally opposite and which were guided through the preceding flow duct plate past its flow duct breakthroughs; that is, in the orientation of FIG. 4, the left upper and the right lower connection duct. Analogously, the two other, mutually diagonally opposite connection ducts, by way of the two circular connection duct breakthroughs 52, 54 of the distributor plate 48 which then, because of the orientation tilted with respect to FIG. 5 by 180°, are situated in the left, lower and right, upper corner area, are guided past the flow duct breakthroughs of this following flow duct plate without any fluidal connection.

In this manner, the plate stack forms two mutually separate fluid duct systems, the flow duct breakthroughs 41 of respective every other flow duct plate 40 being part of the same fluid duct system. Since all flow duct breakthroughs 41 extend in parallel in the stack, this plate construction may be used in the form of a co-current heat transfer device as well as preferably in the form of a countercurrent heat transfer device. In this case, the four circular connection duct breakthroughs 57 to 60 of an end-side intermediate plate 56 can be used as connections, while the opposite plate stack side is covered with an unperforated base plate. As an alternative, the connections may also be provided on two opposite plate stack sides by way of two of the four connection duct breakthroughs 57 to 60 of end-side intermediate plates 56 while covering the respective two remaining breakthroughs. In this case, one breakthrough of the intermediate plate 56 respectively forms the connection for a distributor duct and the diagonally opposite breakthrough forms the connection for the pertaining collecting duct of the same fluid duct system.

With respect to the dimensioning and the flow characteristics of this co-current or countercurrent heat transfer device, the statements made with respect to the preceding example apply analogously. A laminar flow can be achieved by means of a duct width which is small at least in the heat transfer direction, that is, in the stacking direction, while the pressure loss is low. The length of the flow duct breakthroughs determines the length of the effective heat exchange path, and the number of flow duct plates 40 provided in the stack determines the effective total flow cross-section for the two fluids guided through in the countercurrent or in the co-current. In a minimal construction, the plate stack contains, in addition to a base plate, two plate sets with one flow duct plate 40, one distributor plate 48 and one intermediate plate 56 respectively, in which case the two distributor plates 48 are arranged while being flipped by 180° with respect to one another.

Figure 7:
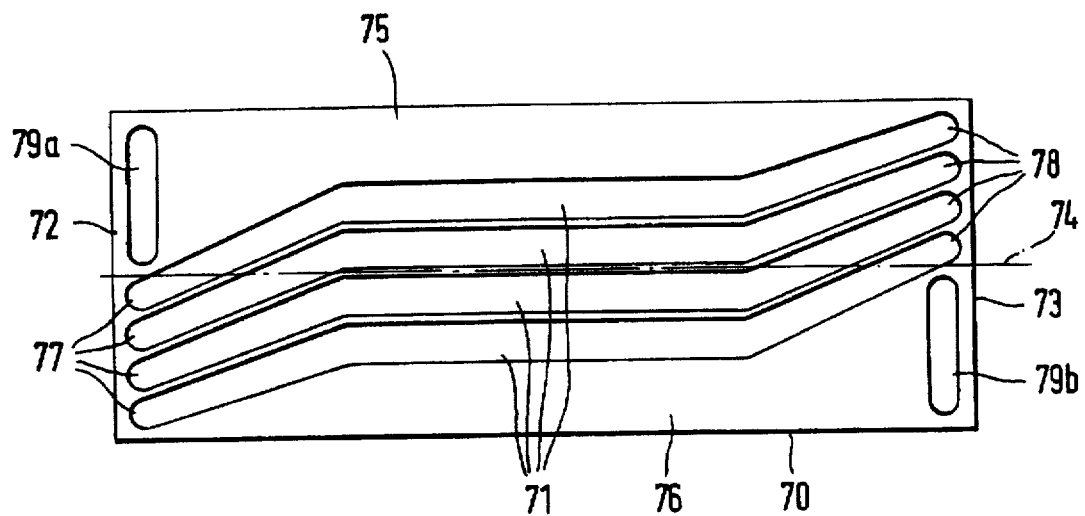
FIG. 7 is a top view of a flow duct plate and a connection cover plate, of which, for implementing a plate stack construction for another co-current or countercurrent heat transfer device, several are alternately stacked above one another in the appropriate manner.
Figure 8:
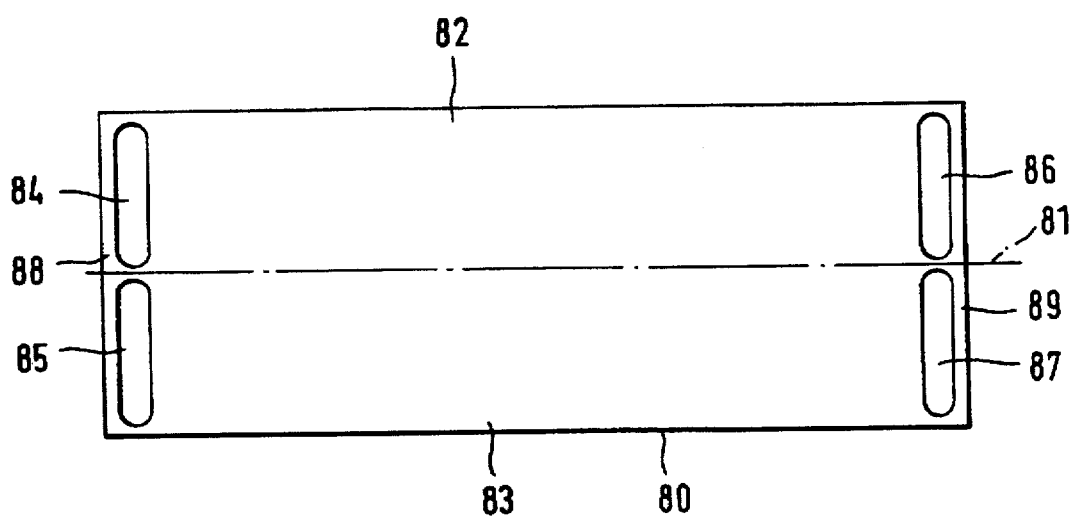
FIG. 8 is a top view of a flow duct plate and a connection cover plate, of which, for implementing a plate stack construction for another co-current or countercurrent heat transfer device, several are alternately stacked above one another in the appropriate manner.

FIGS. 7 and 8 are respective top views of a flow duct plate 70 and a connection cover plate 80 by which a plate construction for another countercurrent or co-current heat transfer device can be implemented. The flow duct plate 70, in each case, contains four flow duct breakthroughs 71 respectively which are arranged side-by-side in a parallel-displaced manner. The breakthroughs 71 extend in a central section in parallel to the longitudinal center axis 74 of the rectangular plate and, in each case, extend in the direction of the ends 77, 78, which are situated at the level of two opposite lateral plate areas 72, 73, being bent in such a manner that their one group of ends 77 are all situated on one half 76 and their other group of ends 78 are situated in a diagonally opposite manner on the other half 75 with respect to the longitudinal plate axis 74. In a corresponding manner, the connection cover plate 80 has, on opposite lateral areas 88, 89, symmetrically to the longitudinal plate axis 81, on each of the thus defined plate halves 82, 83, one elongated connection duct breakthrough 84 to 87 respectively. The remaining plate area is used for the shielding of the flow duct breakthroughs 71 of adjoining flow duct plates 70 and therefore has no additional breakthroughs.

For the construction of the pertaining plate stack, one flow duct plate 70 and one connection cover plate 80 respectively are placed above one another, in which case successive flow duct plates are arranged to be pivoted or flipped with respect to one another by 180°, that is, reversed. This has the result that, originating from a flow duct plate oriented as in FIG. 7 whose ends 77, 78 are situated in the left lateral area in the lower plate half and in the right lateral area in the upper plate half, the corresponding ends of the flow duct breakthroughs of a following flow duct plate end in the same lateral area on the respective other plate half; that is, corresponding to the orientation of FIG. 7, in the left lateral area in the upper plate half and in the right lateral area in the lower plate half. The flow duct breakthroughs 71 of the flow duct plates 70 which follow one another in the stack therefore overlap with their ends 77, 78 alternately with the one and the other pair of mutually diagonally opposite connection duct breakthroughs 84, 87; 85, 86 of the interposed connection cover plates 80. In this case, the two equal-sided ends of the flow duct breakthroughs 71 are in a fluidal connection with one another by way of the pertaining connection duct breakthrough of an adjoining connection cover plate 80 which overlaps with the breakthroughs, as well as with the equal-sided ends of the flow duct breakthroughs of a respective every other flow duct plate by way of the equal-sided connection duct breakthrough of a following flow duct plate arranged inversely and those of the next connection cover plate 80. In contrast, the flow duct breakthroughs 71 of respective successive flow duct plates 70 remain without any fluidal connection.

In this manner, analogously to the preceding example, flow duct systems are formed which are separated from one another by the plate stack and to which, in an alternating manner, the flow duct plates 70 belong which follow one another in the stack and to which two diagonally opposite connection ducts respectively are assigned as the distributor duct and the collecting duct which, while each extending half on the two corresponding plate stack sides in the stacking direction, are formed by the overlapping of the successive connection duct breakthroughs 79a, 79b, 84 to 87 and of the flow duct breakthrough ends 77, 78. Analogously to the preceding example, a connection cover plate situated at the stack end while shielding the opposite stack end by means of an unperforated base plate, may be used as the end plate, or, while appropriately shielding two of the four connection duct breakthroughs 84 to 87, two connection cover plates 80 which are situated opposite one another on the stack end side may act as end plates. In this case, two fluids, between which heat is to be transferred, can be guided separately and in alternating planes, as desired, in the co-current or in the countercurrent, through the plate construction of the heat transfer device. In this case, in turn, the lengths of the flow duct breakthroughs 71 determine the effective heat exchange path and the number of flow duct plates 70 determine the effective overall flow cross-section of the heat transfer device with the laminar flow action. For achieving a low duct width in the heat transfer direction, that is, in the stacking direction, the plates are again constructed with a thickness of preferably no more than 200 µm. The minimal plate construction contains, in addition to a base plate, two flow duct plates 70, which follow one another in the reverse position, and two connection cover plates 80 which are stacked in-between. The individual plates which are stacked above one another are, in turn, connected with one another in a fluid-tight manner by soldering, diffusion welding, etc.

The above description of three embodiments shows that, by means of the invention, heat exchange devices can be provided which have a plate stack construction and which, in a simple manner, are constructed of only a few types of individual plates which can be produced in a technically very simple manner and permit the laminar flowing-through of two heat transfer fluids in a cross-current, a counter-current or a co-current in the case of a small duct width in the heat transfer direction. Such heat transfer devices can be used in multiple manners, for example, as cooling elements for high-temperature batteries. It is understood that, in addition to the described rectangular shape, any other two-dimensional shape can be selected for the plates and that the flow duct breakthroughs must not necessarily extend between opposite lateral plate areas. For example, these breakthroughs may also extend within the plate surface in a curved manner from one lateral area to a lateral area which is not diametrically opposite.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Heat transfer device having several plates with breakthroughs which are stacked upon one another, comprising:

flow duct plate units having at least one flow duct breakthrough extending between two lateral plate areas as well as connection duct breakthroughs arranged separately from the flow duct breakthrough, and connection cover plate units having connection duct breakthroughs arranged at least in two lateral plate areas, wherein the flow duct plate units and the connection cover plate units being alternately stacked above one another in such a manner that:

no fluidal connection exists between the flow duct breakthroughs of adjacent flow duct plate units, equal-sided ends of the flow duct breakthrough of one flow duct plate unit respectively, by way of an overlapping connection duct breakthrough of an adjoining connection cover plate unit is in a fluidal connection with one another, as well as by way of overlapping connection duct breakthroughs of adjoining plate units is in a fluidal connection with the equal-sided ends of the flow duct breakthrough of a respective every other flow duct plate unit, further wherein the flow duct plate units each include a plate with a row of side-by-side flow duct breakthroughs as well as with four connection duct breakthroughs on both sides of the flow duct breakthroughs and at a level of their ends, and wherein the connection cover plate units each including a distributor plate and an intermediate plate disposed above the distributor plate;

said distributor plates in a lateral area having a first elongated connection duct breakthrough, which overlaps with the equal-sided ends of the flow duct breakthroughs of an adjoining flow duct plate, and a second connection duct breakthrough separated therefrom, and, in an opposite lateral area in a point-mirror-symmetrical arrangement, two corresponding additional connection duct breakthroughs, said intermediate plates each having four connection duct breakthroughs which overlap with the four connection duct breakthroughs of an adjoining flow duct plate and with the four connection duct breakthroughs of an adjoining distributor plate, and wherein successive distributor plates each being arranged to be flipped with respect to one another by 180°.

2. Heat transfer device having several plates with breakthroughs which are stacked upon one another, comprising:

flow duct plate units having at least one flow duct breakthrough extending between two lateral plate areas as well as connection duct breakthroughs arranged separately from the flow duct breakthrough, and connection cover plate units having connection duct breakthroughs arranged at least in two lateral plate areas, wherein the flow duct plate units and the connection cover plate units being alternately stacked above one another in such a manner that:

no fluidal connection exists between the flow duct breakthroughs of adjacent flow duct plate units, equal-sided ends of the flow duct breakthrough of one flow duct plate unit respectively, by way of an overlapping connection duct breakthrough of an adjoining connection cover plate unit is in a fluidal connection with one another, as well as by way of overlapping connection duct breakthroughs of adjoining plate units is in a fluidal connection with the equal-sided ends of the flow duct breakthrough of a respective every other flow duct plate unit, further wherein the flow duct breakthroughs of a respective flow duct plate unit are of a constant width and extend from one half of one lateral area to a diagonally opposite half of the other lateral area, while two connection duct breakthroughs are entered in the other two lateral area halves, wherein the connection cover plate units in each half of each of two opposite lateral areas each have an elongated connection duct breakthrough, of which, in each of the two lateral areas, one overlaps with the ends located there of the flow duct breakthroughs of an adjacent flow duct plate unit and the other with its connection duct breakthrough located there, and wherein in the plate stack, successive flow duct plate units are arranged which are each flipped with respect to one another by 180°.

3. Heat transfer device having several plates with breakthroughs which are stacked upon one another, comprising:

flow duct plate units having at least one flow duct breakthrough extending between two lateral plate areas as well as connection duct breakthroughs arranged separately from the flow duct breakthrough, and connection cover plate units having connection duct breakthroughs arranged at least in two lateral plate areas, wherein the flow duct plate units and the connection cover plate units being alternately stacked above one another in such a manner that:

no fluidal connection exists between the flow duct breakthroughs of adjacent flow duct plate units, equal-sided ends of the flow duct breakthrough of one flow duct plate unit respectively, by way of an overlapping connection duct breakthrough of an adjoining connection cover plate unit is in a fluidal connection with one another, as well as by way of overlapping connection duct breakthroughs of adjoining plate units is in a fluidal connection with the equal-sided ends of the flow duct breakthrough of a respective every other flow duct plate unit, further wherein the flow duct breakthroughs of a respective flow duct plate unit extend from one half of one lateral area to a diagonally opposite half of the other lateral area, while two connection duct breakthroughs are entered in the other two lateral area halves, wherein the connection cover plate units in each half of each of two opposite lateral areas each have an elongated connection duct breakthrough, of which, in each of the two lateral areas, one overlaps with the ends located there of the flow duct breakthroughs of an adjacent flow duct plate unit and the other with its connection duct breakthrough located there, wherein said connection duct breakthroughs of the respective flow duct plate unit and said elongated connection duct breakthroughs of the connection cover plate units are equally sized so as to provide a substantially uniform cross-section along a length of the plate stack, and wherein in the plate stack, successive flow duct plate units are arranged which are each flipped with respect to one another by 180°.

* * * * *

UNITED STATES PATENT AND TRADEMARK OFFICE
CERTIFICATE OF CORRECTION

PATENT NO.  : 5,718,286
DATED       : February 17, 1998
INVENTOR(S) : Herbert DAMSOHN et al.

It is certified that error appears in the above-indentified patent and that said Letters Patent is hereby corrected as shown below:

On the title page, item [54], and col. 1, line1:

Please change the title from:

"HEAT TRANSFER DEVICE" to --HEAT TRANSFER DEVICE OF A PLATE STACK CONSTRUCTION--.

Signed and Sealed this

Twenty-first Day of April, 1998

Attest:

BRUCE LEHMAN

Attesting Officer

Commissioner of Patents and Trademarks